United States Patent [19]
Hashimoto

[11] Patent Number: 5,825,204
[45] Date of Patent: Oct. 20, 1998

[54] APPARATUS AND METHOD FOR A PARTY CHECK LOGIC CIRCUIT IN A DYNAMIC RANDOM ACCESS MEMORY

[76] Inventor: Masashi Hashimoto, 14-32 Onogawa, Tsukuba Ibaraki, 305, Japan

[21] Appl. No.: 619,392

[22] Filed: Mar. 21, 1996

[51] Int. Cl.[6] .............................. G06F 19/21; G06F 11/10
[52] U.S. Cl. ........................... 326/54; 371/49.2; 371/51.1
[58] Field of Search ...................... 326/54, 52; 371/37.7, 371/40.1, 49.2, 51.1

[56] References Cited

U.S. PATENT DOCUMENTS

| | | | |
|---|---|---|---|
| 4,262,358 | 4/1981 | Marino, Jr. | 371/49.2 |
| 4,443,876 | 4/1984 | Ng | 371/49.2 |
| 4,879,675 | 11/1989 | Brodnax | 371/49.2 |
| 5,339,322 | 8/1994 | Rastegar | 371/49.2 |
| 5,606,662 | 2/1997 | Wisor | 371/49.2 |

*Primary Examiner*—Michael J. Tokar
*Assistant Examiner*—Richard Roseen
*Attorney, Agent, or Firm*—William W. Holloway; W. James Brady, III; Richard L. Donaldson

[57] ABSTRACT

In a dynamic random access memory unit, a parity check logic circuit includes a parity signal generating circuit which generates a parity signal for each signal group transmitted on the input/output data bus. For a sequence of data groups on the data bus, a parity signal for each data group is generated, the parity signal combined with a parity signal generated for the previous data group or data groups. For a read operations, a parity signal is generated for each of sequence of retrieved data groups and combined with the parity signal(s) of the previous data groups of the sequence. The resulting parity signal is compared with the parity signal associated with the data group sequence and stored in the memory unit to generate a flag signal when the parity signals are not identical. For a write operation, the resulting parity signal for all the data groups is stored in memory unit at a location associated with the sequence of data groups. For a read-modify-write signal, the parity signal generated for each retrieved data signal is compared with the generated parity signal to be written into the memory location. When the signals do not match, the combined parity signal in the memory unit associated with the sequence including the retrieved and stored signal is changed to the opposite logic state.

16 Claims, 5 Drawing Sheets

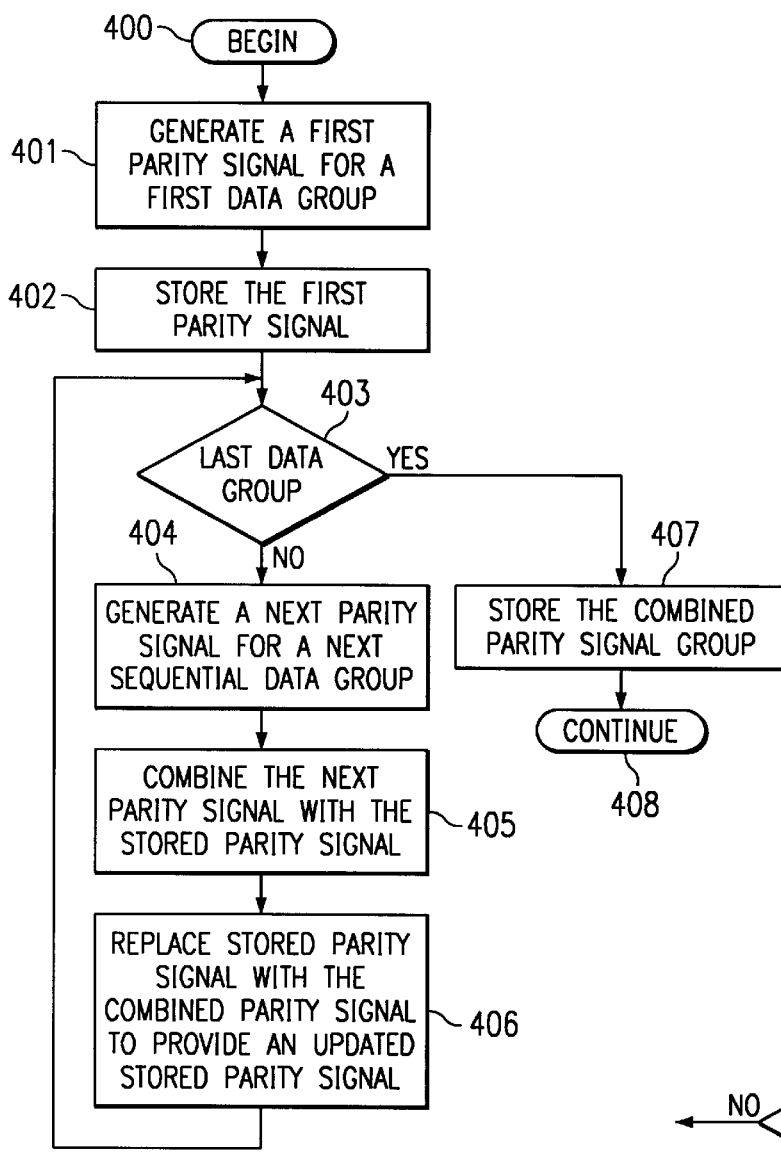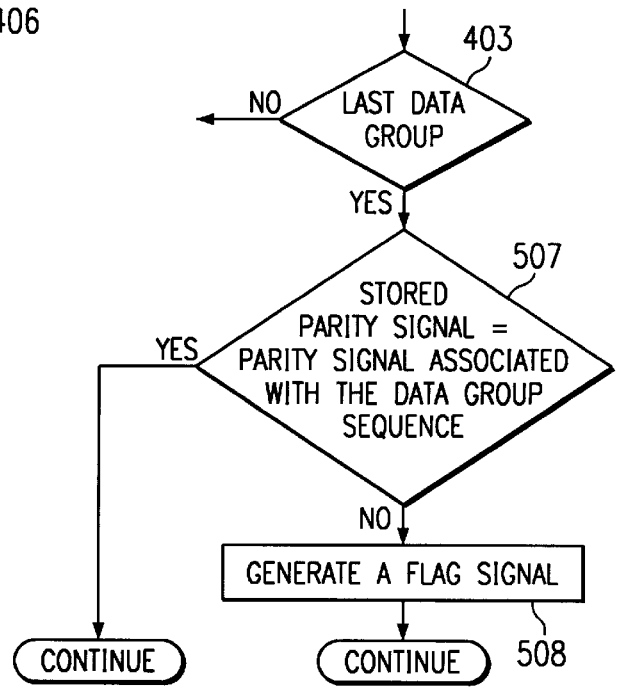

APPARATUS AND METHOD FOR A PARTY CHECK LOGIC CIRCUIT IN A DYNAMIC RANDOM ACCESS MEMORY

BACKGROUND OF THE INVENTION

1. Field of the Invention

This invention relates generally to metal-oxide-semiconductor dynamic random access memory units, and, more particularly, to the detection of errors in the data to be written into or retrieved from the memory units.

2. Description of the Related Art

As the elements in the dynamic random access memory have become smaller, the reduced level of charge and current have made the devices susceptible to events that, even in the presence of functional memory cell units, can compromise the integrity of the data signals processed by the semiconductor memory unit. For example, the impact of an alpha particle on a DRAM memory storage cell can destroy the data stored therein. The compromise of the data stored in the cell by this or similar mechanisms is called a "soft" error. The "soft" error designates a data error which are not permanent, i.e., is not reproducible. While errors produced in this manner are relatively rare, none-the-less, provision must be made for the detection of such errors. Because these "soft" errors are relatively infrequent, apparatus to detect the presence of these errors imposes a relatively large overhead burden in terms additional apparatus.

In order to detect errors, a common technique is to store a parity signal, generated by processing a group of data (logic) signals, along with the data signals. The parity signal has the property that a change in the logic state of one data signal will result in a change in the logic state of the associated parity signal. Therefore, the associated parity signal can be used to detect the presence of an error in a group of data signals. The parity signal generation apparatus generates a parity signal for a data group when the data group is to be stored in the memory unit. The parity signal is stored along with the data group so that when the data group is retrieved from the memory unit storage cells, the parity signal is also retrieved. The parity of the retrieved data group is generated and compared with the retrieved to data signal to determine whether an error has been introduced. In many types of data processing architectures, a sequence of data groups is transferred between the processing unit and the memory unit. In this architecture, a single parity signal can be used for the sequence of data groups. A further complication arises in the read-modify-write memory operation wherein a single data group of the sequence of data groups is retrieved from the storage cells of the memory unit, modified, and stored once again in the location from which it was retrieved. The parity check logic apparatus must be able to function in conjunction with this type of memory operation.

A need has therefore been felt for apparatus and an associated technique for identifying errors in the DRAM memory units that does not require an excessive amount of additional apparatus and can operate with all of the typical memory operations.

SUMMARY OF THE INVENTION

The aforementioned and other features are accomplished, according to the present invention, by providing parity check logic apparatus which determines the parity of a plurality of sequential data groups transmitted over a data bus during a memory unit access. The parity of a first data group is determined and a signal identifying the parity stored in a register. The parity of the second data group is determined, the signal identifying the parity of the second group combined with the signal representing the parity of the first data group, and the combined parity is stored in the register. This process is continued until a signal representing the parity of the entire sequence of data groups is generated. The final combined parity signal is stored in a memory storage cell associated with the sequence of data groups in a memory unit write operation. In a memory read operation, the final combined signal is compared with the stored parity signal associated with the data group sequence and a flag signal generated when these parity signals do not match. In a read-modify-write operation, a parity signal for the retrieved (read) signal group is generated. Then, the parity for the data group (i.e., the modified signal group) to be written into the storage cells is generated and compared with the parity of the retrieved signal group. If these parity signals are different, then the parity signal stored in the memory unit is associated with the sequence of data groups that includes the data group being modified.

These and other features of the present invention will be understood upon the reading of the Specification in conjunction with the Figures.

BRIEF DESCRIPTION OF THE DRAWINGS

FIG. 4 is a flow chart for parity generation in a write process according to the present invention.

FIG. 5 illustrates the changes in the flow chart of FIG. 4 to implement parity verification for a read process according to the present invention.

DESCRIPTION OF THE PREFERRED EMBODIMENT(S)

Figure 1:
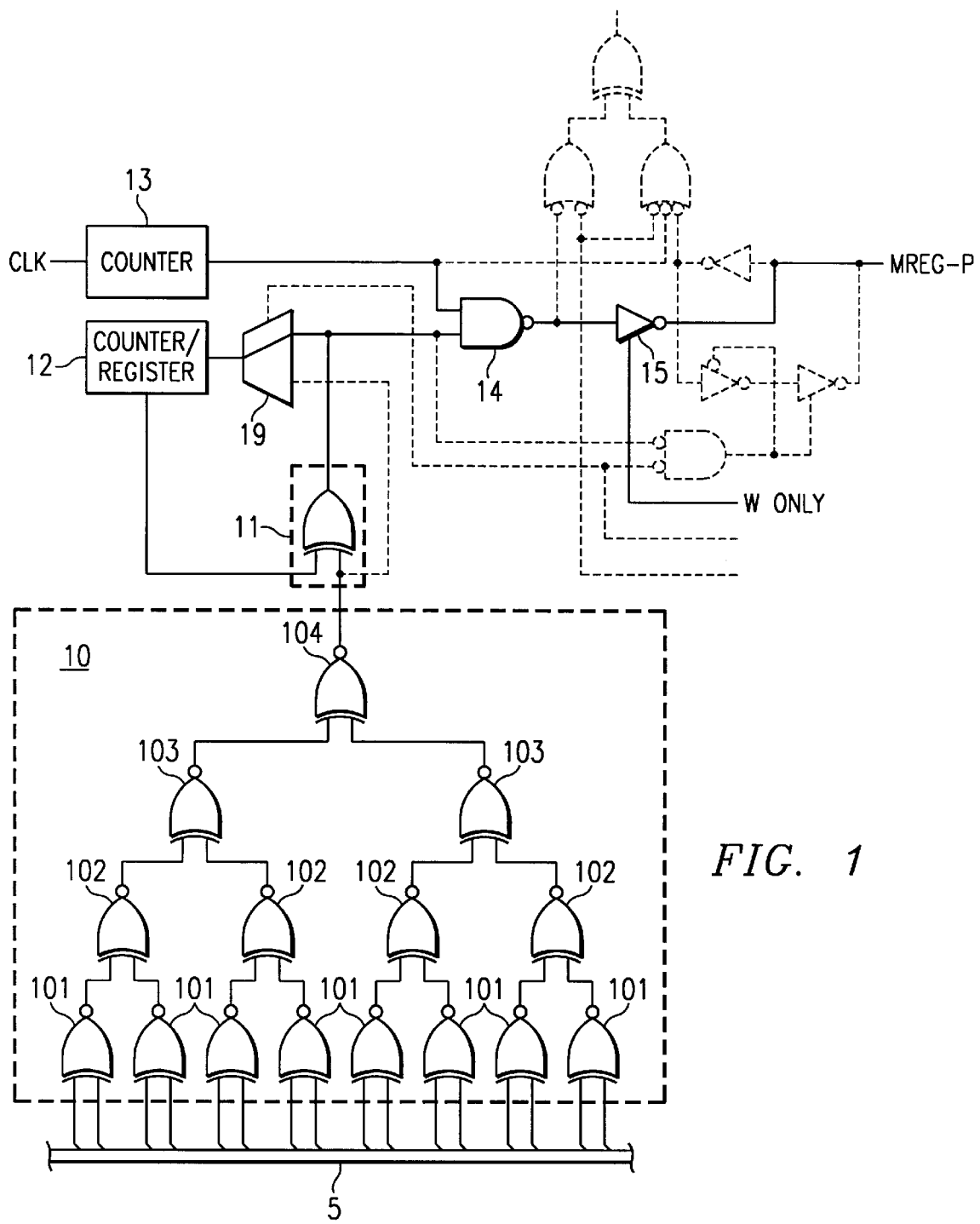
FIG. 1 is a schematic diagram of a parity check logic circuit in the write mode of operation according to the present invention.

1. Detailed Description of the Drawings Referring now to FIG. 1, a schematic diagram of the parity check circuit in the write mode of operation is shown. A data bus 5, is coupled to a parity signal generating circuit 10. In the preferred embodiment, the input/output data bus 5 has 16 conductors, each conductor carrying one of a group of data signals. Each conductor of data bus 5 is coupled to an input terminal of one of 8 exclusive NOR logic gates 101. The output terminals of each of exclusive NOR logic gate 101 is coupled to an input terminal of four exclusive NOR logic gates 102. Each output terminal of the exclusive NOR logic gates 102 is coupled to an input terminal of two exclusive NOR logic gates 103. Each output terminal of exclusive NOR logic gates 103 are applied to input terminals of exclusive NOR gate 104. The output terminal of exclusive NOR gate 104, that is the output terminal of parity generating circuit 10, is coupled to a first input terminal of exclusive OR gate 11. An output terminal of exclusive OR logic gate 11 is coupled to a first input terminal of NAND logic gate 14 and, through multiplexer 19, to an input terminal of counter/register 12. An output terminal of counter register 12 is coupled to a second input terminal of exclusive OR logic gate 11. A counter 13 receives a clock signal CLK and applies an output signal to a second terminal of NAND logic gate 14. The output signal of NAND logic gate 14 is applied to an input terminal of inverting amplifier 15. Inverting amplifier 15 is enabled or disabled by a W ONLY signal with a logic "1" state or a logic "0" state respectively. The output signal of inverting amplifier 15 is the parity (logic) signal.

Figure 2:
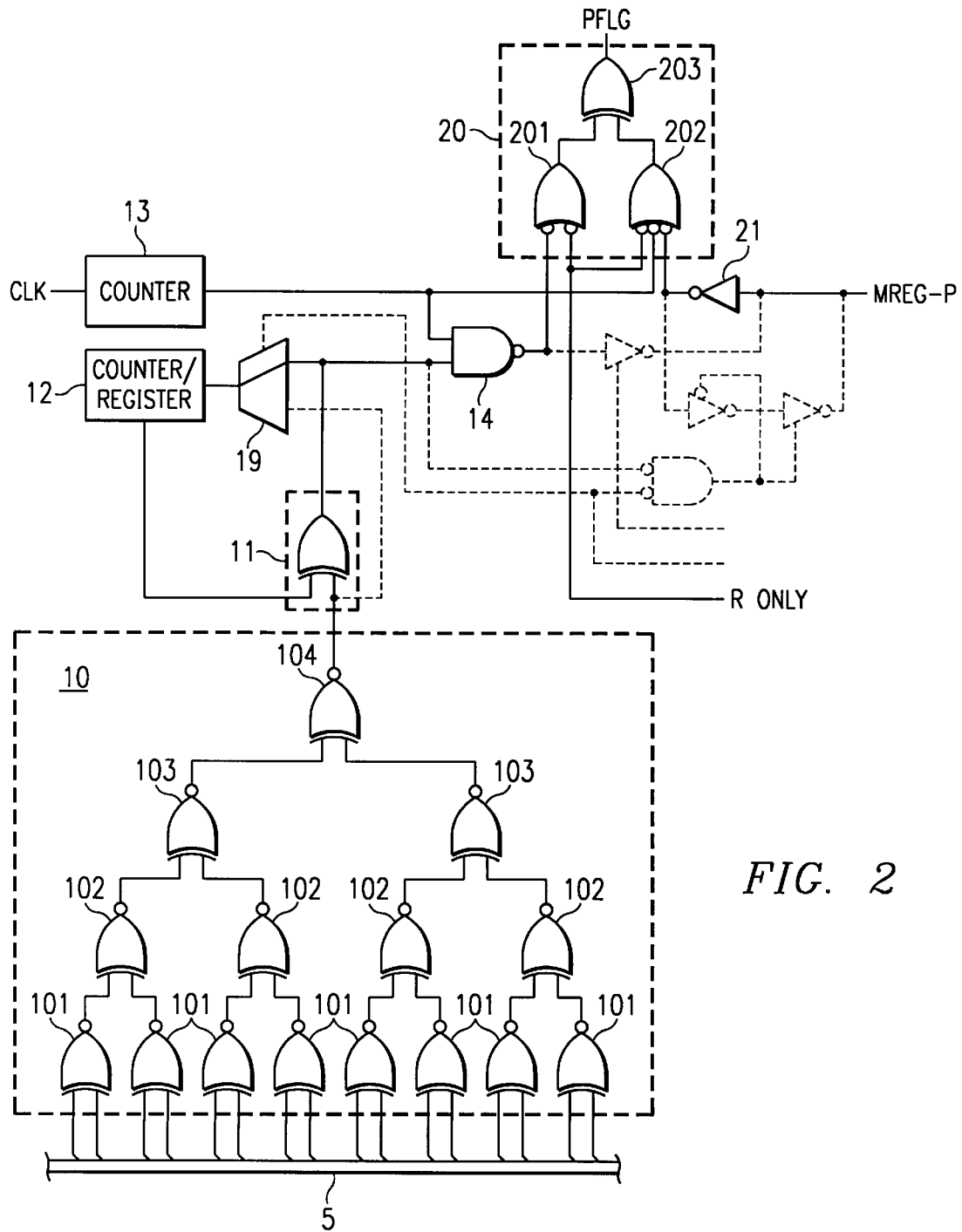
FIG. 2 is a schematic diagram of a parity check logic circuit in the read mode of operation according to the present invention.

Referring next to FIG. 2, the schematic diagram of the parity check logic circuit in a read operation is shown. The data bus 5, the parity signal generating circuit 10, counter 13, counter/register 12, and NAND logic gate 14 are coupled as described with reference to FIG. 1. However, the inverting amplifier 15 of FIG. 1 is no longer enabled by the W ONLY signal. Instead, inverting amplifier 21 receives a MREG-P signal, this signal indicating the parity of the data group to be read. An R ONLY signal is applied to a first input terminal of NAND logic gate 201 and to a first input terminal of NAND logic gate 202. A second input terminal of NAND logic gate 201 has the output signal from NAND logic gate 14 applied thereto. An output signal from inverting amplifier 21 is applied to a second input terminal of NAND logic gate 202, while an output signal from counter 13 is applied to a third input terminal of NAND logic gate 202. The output terminal of NAND gates 201 and 202 are coupled to input terminals of exclusive OR logic gate 203. The output signal PFLG is provided by the output terminal of exclusive OR gate 203.

Figure 3:
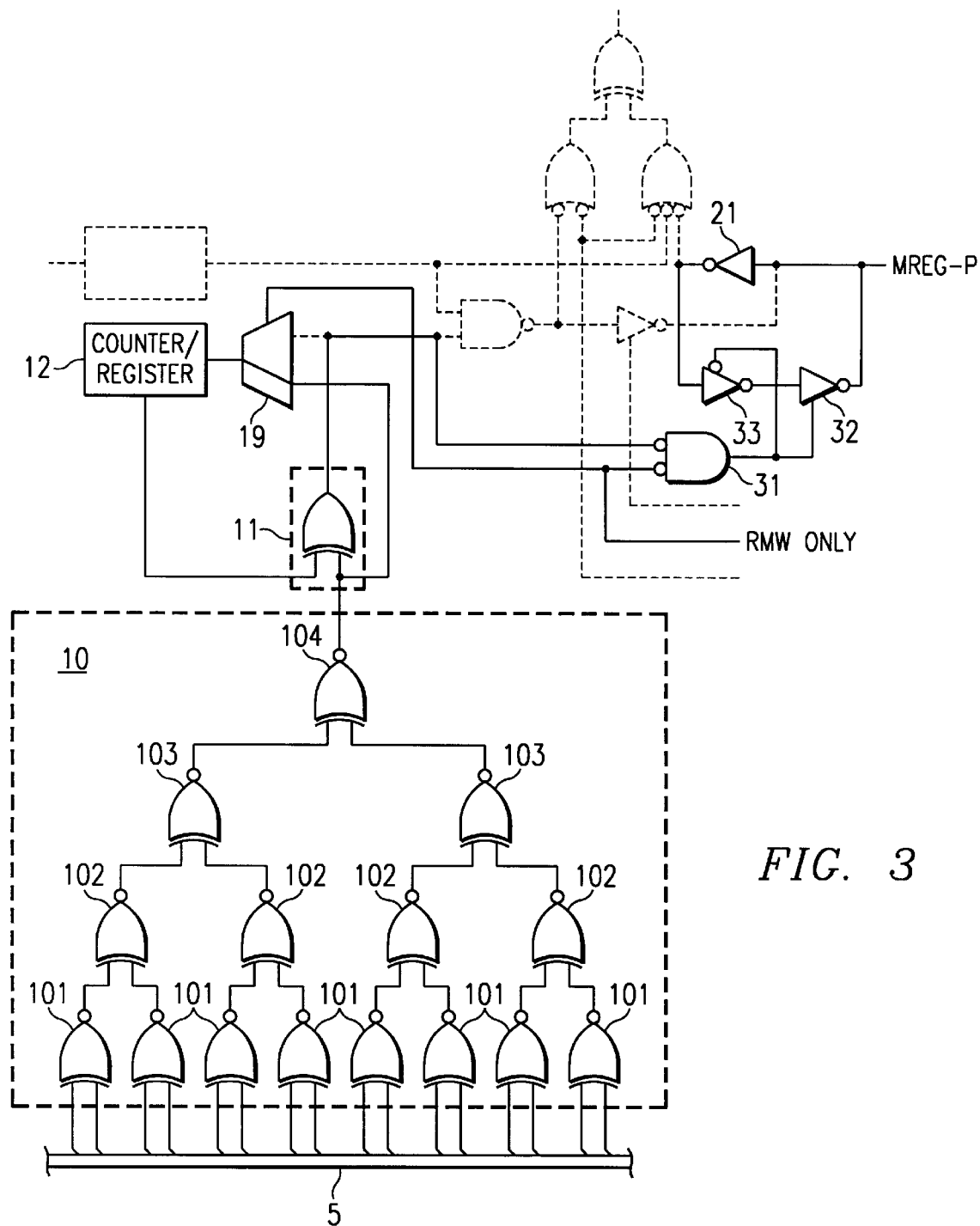
FIG. 3 is a schematic diagram of a parity check logic circuit in the read-modify-write mode of operation according to the present invention.

Referring to FIG. 3, the schematic diagram of the parity check logic circuit use in the read-modify-write operation, according to the present invention, is shown. The data bus 5 is coupled to the parity signal generating circuit 10 and the parity signal generating circuit 10 has an output terminal coupled to a first terminal of exclusive OR logic gate 11. The output terminal of the parity generating circuit 10 is also coupled through multiplexer 19 to an input terminal of counter/register 12. The output terminal of counter/register 12 is coupled to a second input terminal of exclusive OR gate 11. The output terminal of exclusive OR gate 11 is coupled to a first input terminal of NOR logic gate 31. A second input terminal of NOR logic gate 31 has the RMW ONLY signal applied thereto. The output terminal of NOR logic gate 31 is coupled to an disabling or enabling terminal of inverting amplifier 33, amplifier 33 being disabled by a logic "1" signal and being enabled by a logic "0" signal, respectively and to an enabling or disabling terminal of inverting amplifier 32, amplifier 32 being enabled by a logic "1", signal and being disabled by a logic "0" signal, respectively. A MREG-P signal is applied to an input terminal of inverting amplifier 21. The output terminal of inverting amplifier 21 is coupled to an input terminal of inverting amplifier 33. The output terminal of inverting amplifier 33 is coupled to an input terminal of inverting amplifier 32. The output terminal of inverting amplifier 32 is coupled to the input terminal to inverting amplifier 21.

Referring to FIG. 4, a flow diagram illustrating the operation of the present invention for generating a parity signal for a write operation is shown. In step 401, a first parity signal is generated identifying the parity of the first data group in a sequence of data groups. The first parity signal is stored in step 402. In step 403, a determination is made whether the (first) data group is the last data group of the sequence of data groups. If the determination has a NO result, then in step 404 a next parity signal is generated for the next sequential data group. In step 405, the next parity signal is combined with the stored parity signal. The combined parity signal is now stored and becomes the updated parity signal. The process returns to step 403 where a determination is made whether the data group for which the next parity signal was generated was the last data group in the sequence of data groups. When the determination is a NO result, the process continues in step 404. When a parity signal is generated for last data group of the sequence of data groups, then the determination is step 407 is YES result. The combined or stored parity signal is then stored in the memory unit in a location associated with the sequence of data groups which are store during the write process.

Referring to FIG. 5, the changes to the flow diagram of FIG. 5 needed for checking the parity of the stored sequence of data groups during read operation, according to the present invention, is shown. As shown in FIG. 5, the determination is made in step 403, that a parity signal has been generated for all of the data groups of the sequence and the parity signals have been combined in a stored parity signal. In step 507, the stored parity signal is compared with an associated parity signal retrieved from the memory unit along with the sequence of data groups. (The retrieved parity signal identifies the parity of sequence of the data groups at the time when the sequence of data groups was stored in the memory unit.) When the result of the comparison in step 507 is a YES result, then the operation of the data processing unit continues. When the result of the comparison in step 507 is a NO result, then in step 508 a flag signal is generating alerting the data processing system that the retrieved data group sequence may include be in error.

Figure 6:
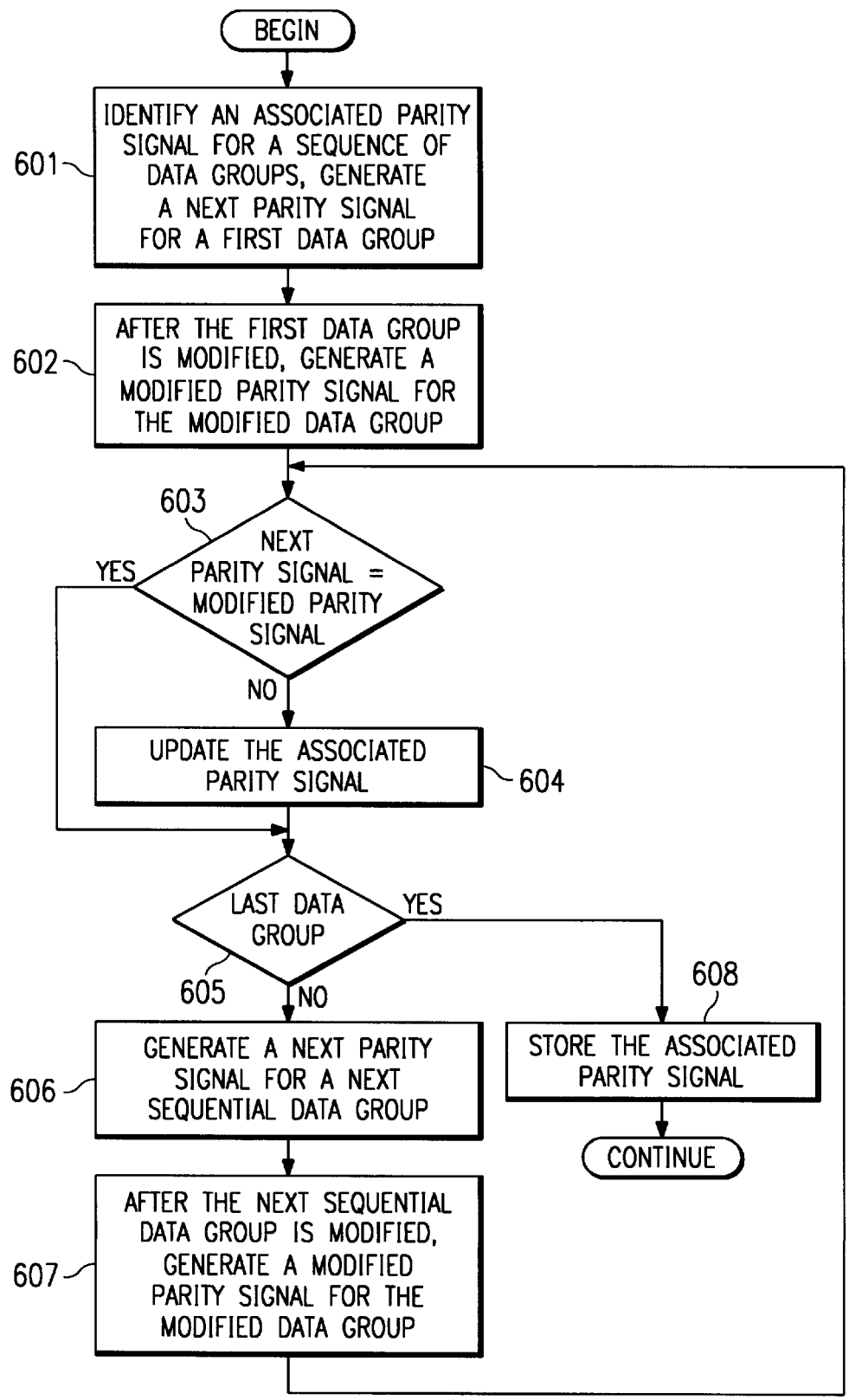
FIG. 6 is a flow chart for parity generation in a read-modify-write process according to the present invention.

Referring to FIG. 6, a flow diagram for generating a parity signal for a sequence of data groups in a read-modify-write operation is shown. In step 601, an associated parity signal, i.e., associated with the data group sequence involved in the read-modify-write operation, is retrieved from the memory unit or identified in some manner. A next parity signal is generated for the first data group of the sequence as a part of step 601. In step 602, after the first data group is modified, a modified parity signal is generated for the modified signal group. In step 603, the modified parity signal is compared with the next parity signal. When the comparison is negative, i.e., a NO result, in step 603, the associated parity signal is updated. After the associated parity signal is updated or when the next parity signal is equal to the modified parity signal, a determination is made whether the data group modified was the last data group. When the modified data group is not the last data group, a next parity signal is generated for the next sequential data group in step 606. In step 607, after the next data group is modified, a modified parity signal is generated for the next sequential modified data signal group. The process is returned to step 603 where a comparison is made between the next parity signal and the modified parity signal. When the comparison is negative, i.e., a NO result, the associated parity signal is updated. This process continues until the last data group of the sequence of data groups is identified in step 605. When the last data group is identified, i.e., a YES result, the final associated parity signal is stored in the memory unit in a location associated with the locations of the stored, modified signal groups.

2. Operation of the Preferred Embodiment(s)

Referring to FIGS. 1, 2, and 3, the read mode of operation, the write mode of the operation, and the read-modify-write mode of operation share a common set of components. In each Figure, the unused components for each mode of operation are shown with dotted lines.

The present invention is used most advantageously in a pipeline structure wherein an interaction with the memory unit involves a plurality of data groups sequentially applied to, or retrieved from, the memory unit. As each data group of a sequence is transmitted on the data bus 5, the parity signal generating circuit determines the parity of the transmitted data group. For a write operation, the counter/register 12 is initialized. This initialized counter/register 12 applies a signal to an input terminal of the exclusive OR logic gate 11 that permits a signal to be transmitted therethrough. As the first data group is transmitted over the data bus 5, the parity signal generating circuit provides a parity signal. This parity signal is then applied to the counter/register 12 through the (initialized) exclusive OR logic gate 11. The parity signal applied to the counter/register 12 is stored therein and applied to an input terminal of exclusive OR logic gate 11. When the second data group is transmitted over the data bus 5, the parity signal generating circuit 10 determines the parity of the second data group and applies the appropriate signal to a terminal of exclusive OR logic gate 11. Because the parity signal of the first data group is applied to the second terminal, the output signal of the exclusive OR logic gate 11 will have the parity of both the first and the second data groups. This combination parity signal will be stored in the counter/register 12 and applied to a control terminal of exclusive OR logic gate 11. As each data group is transmitted by over the data bus 5, the combination parity stored in counter/register 12 will be updated and will represent the combined parity of all the previous data groups. The read-modify-write signal changes the state of multiplexer 19 so that, instead of being coupled to the output terminal of exclusive OR logic gate 11, the input terminal of counter/register 12 is coupled to the output terminal of exclusive NOR logic gate 104.

Counter 13 receives the clock (CLK) signal. The clock signal is synchronized with the transmission of the data groups. In a write operation, the counter 13, upon receiving the clock signal identifying the final data group of the sequence, provides a signal to the input of NAND logic gate 14 that permits the combined or resulting parity signal to be stored in a location in the memory unit associated with the sequence of data groups. In a read operation, the parity signal from the storage location (MREG-P) associated with the sequence of data groups is compared with the parity of this sequence of data groups generated by the parity check circuit. When this comparison is false, a flag (PFLG) signal is generated indicating the presence of an error in the retrieved data. The counter 13, in response to CLK signals synchronized with the sequence of data signals retrieved from the memory unit storage locations, enables NAND logic gate 14, and NAND logic gates 201 and 202, to permit the generation of the flag signal.

In the read-modify-write operation, a portion of a data group sequence, is to be modified. Rather than retrieve the entire sequence of data group, modify the designated data group, and store the modified data group sequence in the same memory locations, in the present invention, a particular data group (i.e., from the sequence to be modified) is retrieved, modified, and stored in the same memory location from which the data group was retrieved. Any modification in the retrieved data group that causes a change in parity for the retrieved data group results in a change in parity for the entire sequence of data groups. In order to provide an appropriate change in the parity signal associated with the stored (and modified) data group sequence, each retrieved data group in this operation has a parity signal generated therefor when it is applied to the data bus 5. The parity signal is stored, by means of multiplexer 19 activated by the RMW ONLY signal, is counter/register 12. After the data group has been modified, the modified data group, when applied to the data bus 5 for storage, has a parity signal generated therefor. This parity signal is compared with the parity signal stored in the counter/register 12. If the two signals are different, then the parity signal stored in the MREGP storage location and associated with the entire data group sequence is changed to the opposite logic state by inverting amplifier 21 and logic gates 31–33. In this manner, the parity of the stored data signal is consistent with the associated stored sequence of data groups.

While the invention has been described with particular reference to the preferred embodiment, it will be understood by those skilled in the art that various changes may be made and equivalents substituted for elements of the preferred embodiment without departing from the invention. In addition, many modifications may be made to adapt a particular situation and material to a teaching of the present invention without departing from the essential teachings of the present invention.

As is evident from the foregoing discussion, certain aspects of the invention are not limited to the particular details of the examples illustrated, and it is therefore contemplated that other modifications and applications will occur to those skilled in the art. For example, while the parity generating unit is implemented in exclusive NOR logic gates, this unit can equally as well be implemented with other logic components, such as exclusive OR logic gates. It is accordingly intended that the claims shall cover all modifications and applications as do not depart from the spirit and scope of the invention.

What is claimed is:

1. A parity check circuit for use with a sequence of signal groups transmitted on a data bus, said circuit comprising:

a parity signal generating unit coupled to said data bus for generating a parity signal determined by a signal group transmitted by said data bus;

a parity combining unit for combining a most recently generated parity signal with a stored parity signal to provide an updated stored parity signal;

a counter/gate unit for enabling transmission of said updated stored parity signal after transmission of said sequence of signal groups; and a gate unit responsive to a write signal for transmitting said updated parity stored signal.

2. The parity check circuit of claim 1 wherein said counter/gate unit is responsive to a clock signal.

3. The parity check circuit of claim 1 further comprising:
   a comparison circuit, a first input terminal of said comparison circuit having an associated parity signal associated with said sequence of signal groups applied thereto; and
   a gate unit responsive to a read signal for applying updated stored parity signal to said comparison unit, said comparison unit applying a flag signal to an output terminal when said updated stored parity signal and said associated parity signal are not identical.

4. The parity check circuit of claim 1 wherein said parity combining unit is configured as a comparison unit, said comparison unit providing an error signal when two consecutive data signal groups are applied to said data bus provide a different parity signal, said parity check circuit further comprising a gate unit coupled to a storage location and to said comparison unit for changing a logic signal stored in said storage location in response to said error signal and a read-modify-write signal.

5. The parity check circuit of claim 1 wherein said parity generating unit includes exclusive NOR logic gates.

6. The parity check circuit of claim 1 wherein said parity generating unit includes exclusive OR logic gates.

7. In a write operation, a method for checking parity of a sequence of data groups transmitted on a data bus, said method comprising the steps of:
   a.) generating a first parity signal for a first data group;
   b.) storing said first parity signal as a stored parity signal;
   c.) generating a next parity signal for a next sequential data group;
   d.) combining said next parity signal with said stored parity signal to provide a combined data signal;
   e.) storing said combined data signal as said stored parity signal;
   f.) repeating steps c.) through e.) until a parity signal for a last sequential data group is combined with said stored parity signal to form a last combined parity signal; and
   g.) storing said last combined parity signal in a memory location associated with said sequence of data groups for a write operation.

8. In a read operation, a method for comparing the parity of the sequence of read data groups with an associated parity signal associated with the stored sequence of data groups, said method comprising the steps of claim 7 wherein step g is replaced by:
   h.) in a read operation, comparing said last combined parity signal with an associated parity signal associated with said sequence of data groups; and
   i.) generating a flag signal when said associated parity signal and said last combined parity signal are not identical.

9. In a read-modify-write operation for a sequence of data groups, a method for updating the parity of the sequence of data groups said method comprising the steps of:
   a.) retrieving an associated parity signal associated with said sequence of data groups and generating a next parity signal for a first data group of said sequence of data groups;
   b.) after said first data group is modified, generating a modified parity signal for a modified first data group;
   c.) comparing said modified parity signal with said next parity signal; and
   d.) changing said associated parity signal to an opposite state when said modified parity signal is not the same as said next parity signal;
   e.) after step d and when said next parity signal is the same as said modified parity signal, determining whether the data group modified was the last data group of the sequence;
   f.) when the data group modified was not the last data group of the sequence, generating a next parity signal for a next data group in said sequence of data groups;
   g.) after said next data group is modified, generating said modified parity signal and return to step c;
   h.) in step e, when said most recent data signal group to be modified is the last data signal group of the sequence, storing said associated parity signal in association with said sequence of data signal that have been modified.

10. A parity checking circuit for use in a memory unit in which a plurality of sequential data groups are exchanged with a processing unit over a data bus, said circuit comprising:
    a parity generating unit coupled to said data bus and generating parity signal for a signal group being transmitted over said data bus;
    a combining unit coupled to said parity generating unit for combining parity signals generated in response to said plurality of sequential data groups in response to a first control signal to provide a combined parity signal, said combining unit comparing each parity signal with a next sequential parity signal in response to a second control signal to provide a comparison signal;
    comparison unit; and
    a gate unit applying said combined parity signal to an output terminal in response to a write signal, said gate unit applying said combined signal to said comparison unit in response to a read signal.

11. The parity checking circuit of claim 10 wherein said comparison unit compares said combined parity signal generated in response to a sequence of data groups retrieved from said memory unit and a stored parity signal associated with said sequence of data groups retrieved from said memory unit, said comparison unit generating a flag signal when said comparison is false.

12. The parity checking circuit of claim 10 wherein said second control signal is a read-modify-write signal, said parity checking circuit further comprising a change means responsive to said comparison signal for altering a logic state of parity signal stored in said memory unit, said parity signal stored in said memory unit being associated with said data group to be modified.

13. The parity checking circuit of claim 10 wherein said parity generating unit is comprised of a plurality of exclusive OR logic gates.

14. The parity checking circuit of claim 10 wherein said gate circuit is responsive to CLK signals.

15. The parity checking circuit of claim 14 wherein said plurality of sequential data groups are synchronized with said CLK signals.

16. The parity checking circuit of claim 10 wherein said combining unit includes:
    a counter/register unit for storing parity signals,
    an OR logic gate having a first input terminal coupled to said parity generating unit, and
    a multiplexer applying an output signal from said OR gate to counter/register unit in response to said first control signal, said multiplexer applying an output signal from said parity generating circuit to said counter register unit in response to said second control signal.

* * * * *